3,272,227
PILOT OPERATED PRESSURE REGULATOR
Carter P. Williams, La Crescenta, Calif., assignor to Kobe, Inc., Huntington Park, Calif., a corporation of California
Filed Feb. 17, 1964, Ser. No. 345,247
6 Claims. (Cl. 137—491)

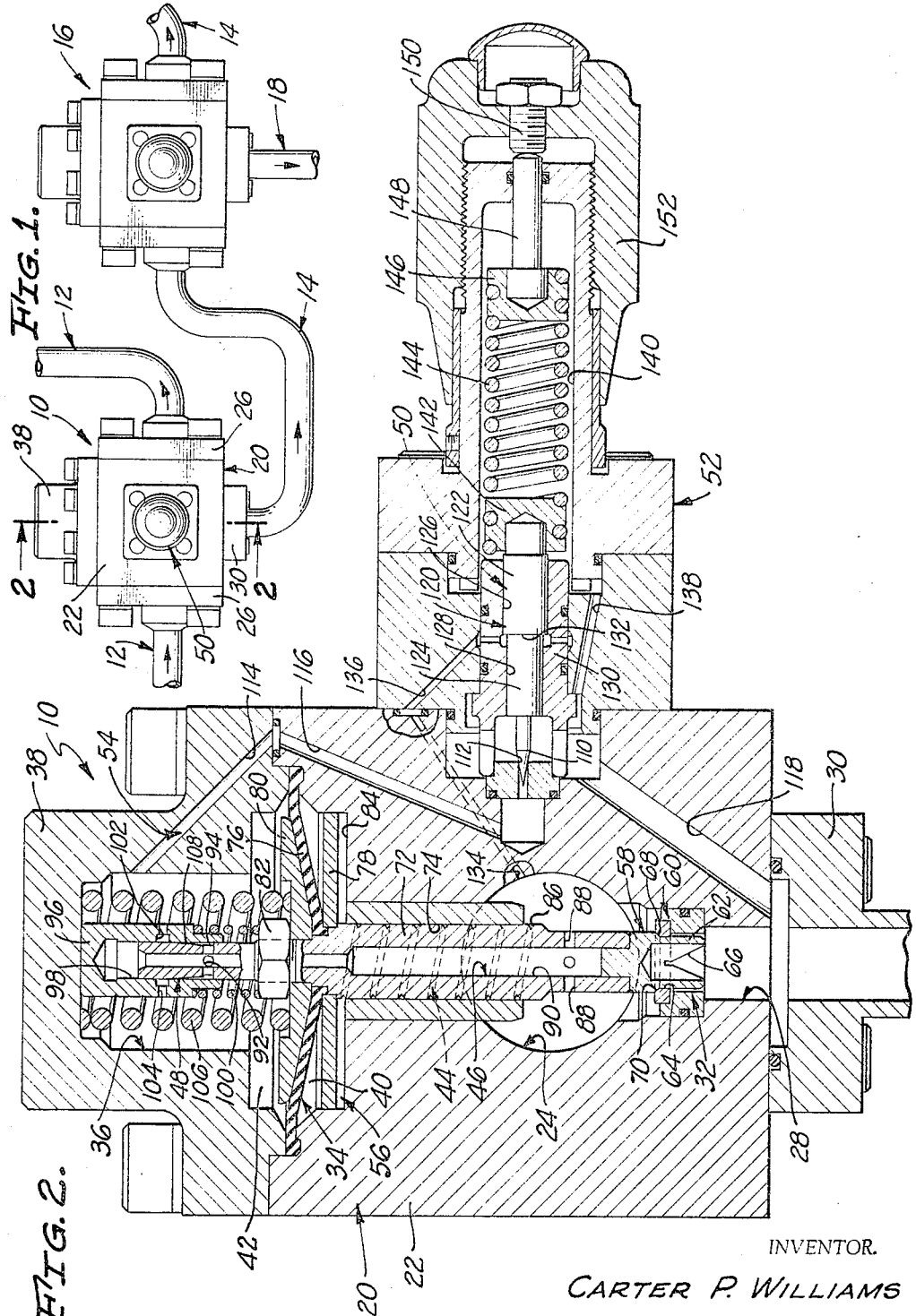

The present invention relates in general to devices for controlling or regulating fluid pressures, and a general object is to provide a pressure controller or regulator which is of particular utility in the oil well pumping field to control or regulate the pressure of operating fluid supplied to fluid-operated oil well pumps, it being understood, however, that the invention has utility in other fields.

Still considering the invention generally, objects thereof are to provide a pressure regulator which is capable of handling high flow rates at high pressures with close regulation, e.g., within plus or minus one percent of its maximum pressure rating, which is capable of handling the frequently contaminated crude oils commonly used as operating fluids for fluid-operated oil well pumps, and which is capable of being operated solely by the fluid it is controlling so that no external source of power is required.

More particularly, a primary object of the invention is to provide a pressure regulator for maintaining a substantially constant fluid pressure relative to a lower, reference pressure, irrespective of whether the reference pressure is a low pressure equal to or close to atmospheric pressure, or is itself a high pressure. Expressed differently, a primary object is to provide a regulator capable of maintaining a substantially constant differential between the fluid pressure in a high pressure system and the fluid pressure in a low pressure, reference system.

Thus, the pressure regulator of the invention may be utilized either to maintain a substantially constant fluid pressure with reference to atmospheric pressure, or it may be utilized to maintain the fluid pressure in a high pressure system a substantially constant increment above the fluid pressure in a low pressure system which is itself at a pressure well above atmospheric. Another possibility is to use a first pressure regulator of the invention to maintain a first substantially constant fluid pressure relative to atmospheric pressure, to use a second pressure regulator of the invention to maintain a second substantially constant fluid pressure relative to the first substantially constant fluid pressure, and so forth.

With an arrangement of the foregoing nature, the invention may be utilized to provide two or more fluid sources at different substantially constant pressures. Such an arrangement is particularly well suited for pumping oil wells with fluid operated pumps in an oil field where different wells require different operating-fluid pressures because of differences in well depth, differences in well productive capacity, differences in the viscosity of the oil to be produced, and the like. Merely by way of example, a first pressure regulator of the invention may be utilized to maintain a first pressure system at a pressure of 3,500 p.s.i. above atmospheric, and a second pressure regulator of the invention may be utilized to maintain a second pressure system at a pressure of 500 p.s.i. above the pressure in the first pressure system, i.e., at a pressure of 4,000 p.s.i. The first pressure system may be utilized to supply one or more fluid-operated oil well pumps with operating fluid at a pressure of 3,500 p.s.i., while the second pressure system may simultaneously be used to supply one or more fluid-operated oil well pumps with operating fluid at a pressure of 4,000 p.s.i.

Considering the invention somewhat more specifically now, it contemplates a pressure regulator comprising: a housing having high pressure and low pressure passages respectively connectible to high pressure and low pressure systems, such as high pressure and low pressure lines or headers; main valve means including a main valve movable from a closed position to an open position to bypass fluid from the high pressure passage to the low pressure passage as required to maintain a substantially constant fluid pressure in the high pressure passage; main actuating means, operable by a main fluid pressure differential acting between opposite sides thereof, for moving the main valve from its closed position toward its open position; and pilot valve means, operable by a pilot fluid pressure differential, for applying to the main actuating means a main fluid pressure differential for producing movement of the main valve from its closed position toward its open position to bypass fluid from the high pressure passage to the low pressure passage as required to maintain the fluid pressure in the high pressure passage substantially constant.

An important object of the invention is to provide a pressure regulator of the foregoing nature wherein the pilot fluid pressure differential is equal to a predetermined difference between the fluid pressures in the high pressure and low pressure passages so that the fluid pressure in the high pressure passage is maintained substantially constant relative to the fluid pressure in the low pressure passage.

Another object is to provide a pilot valve means the operation of which is substantially independent of any fluid pressures except the fluid pressures in the high pressure and low pressure passages.

Another important object is to provide adjustment means connected to the pilot valve means for varying the predetermined difference between the fluid pressures in the high pressure and low pressure passages to which the pilot valve means responds, thereby varying the substantially constant differential maintained between the fluid pressures in the high pressure and low pressure passages so as to vary the fluid pressure maintained in the high pressure passage.

Another object of the invention is to provide a pressure regulator wherein the main fluid pressure differential produced by the pilot valve means is equal to a difference between fluid pressures respectively acting on first and second sides of the main actuating means and biasing the main valve toward its open and closed positions, the first and second sides of the main actuating means respectively being supplied with fluid from the high pressure passage through first and second passage means. A related object is to provide a pressure regulator wherein the pilot valve means connects the aforementioned second side of the main actuating means to the low pressure passage to reduce the fluid pressure on the second side of the main acting means to a value below that on the first side thereof so as to produce the desired main fluid pressure differential for moving the main valve from its closed position toward its open position.

An important object of the invention is to provide metering valve means in and controlling flow through the aforementioned second passage means, and including a metering valve connected to the main actuating means, for decreasing the resistance to flow from the high pressure passage through the second passage means to the second side of the main actuating means as the main valve is moved from its closed position toward its open position. This construction provides a negative feedback means for reducing the main fluid pressure differential as the main valve is moved from its closed position toward its open position, thereby improving the stability of the pressure regulator of the invention.

Another object of the invention is to provide the aforementioned first passage means with means for restricting flow between the high pressure passage and the first side of the main actuating means to control the rate of response of the pressure regulator.

Another object is to further improve the stability of the pressure regulator by providing dashpot means connected to the main actuating means and communicating with the aforementioned first passage means.

Another and important object of the invention is to still further improve the stability of the pressure regulator of the invention by minimizing variations in the fluid-flow forces applied to the main valve with variations in the position of the main valve. More particularly, an important object in this connection is to provide a main valve means which include a cylindrical valve seat and to provide a main valve which includes a sleeve valve slidable in the cylindrical valve seat and having longitudinally extending, V-shaped ports therein. With this construction, forces resulting from fluid flow between the main valve and its seat do not vary significantly with changes in the position of the main valve relative to its seat, and thus do not significantly affect the stability of the pressure regulator, which is an important feature.

The foregoing objects, advantages, features and results of the present invention, together with various other objects, advantages, features and results thereof which will be evident to those skilled in the pressure controlling art in the light of this disclosure, may be achieved with the exemplary embodiment of the invention described in detail hereinafter and illustrated in the accompanying drawing, in which:

FIG. 1 is a view showing, on a reduced scale, two pressure regulators of the invention interconnected to maintain two different, substantially constant fluid pressures; and FIG. 2 is an enlarged, sectional view taken as indicated by the arrowed line 2—2 of FIG. 1.

*General regulating arrangement*

In the drawing, the numeral 10 designates a pressure controller or regulator of the invention for maintaining a substantially constant fluid pressure in a high pressure system 12 relative to the fluid pressure in a low pressure system 14. In the arrangement illustrated in FIG. 1, the low pressure system 14 associated with the pressure regulator 10 acts as a high pressure system with respect to a second pressure regulator 16 of the invention which is identical to the pressure regulator 10 thereof. The pressure regulator 16 maintains the fluid pressure in the system 14 substantially constant relative to a still lower fluid pressure in a system 18.

As will become apparent, the fluid pressure in the system 18 acts as a reference pressure with respect to which the fluid pressure in the system 14 is maintained substantially constant by the pressure regulator 16. Similarly, the fluid pressure in the system 14 acts as a reference pressure with respect to which the fluid pressure in the system 12 is maintained substantially constant by the pressure regulator 10.

Such an arrangement may, for example, be utilized to supply operating fluid at two different, substantially constant pressures to two different groups of fluid-operated oil well pumps, one group being connected to the high pressure system 12 and the other to the intermediate pressure system 14. It will be understood that the high pressure system 12 may be supplied by an suitable pumping equipment, such as a triplex pump, not shown. The low pressure system 18 is preferably at atmospheric pressure and may lead to a reservoir, not shown, supplying the inlet of the triplex pump mentioned.

The two pressure regulators 10 and 16 are identical in structure and operation. Consequently, only the pressure regulator 10 will be considered herein. For convenience, the systems 12 and 14 will be referred to as high pressure and low pressure systems with reference to the pressure regulator 10, even though the system 14 serves as a high pressure system with reference to the regulator 16.

*General construction of pressure regulator 10*

Referring to FIG. 2, the pressure regulator 10 of the invention includes a housing 20 having a body 22 provided therethrough with a high pressure passage 24 connected at its ends to the high pressure system 12 by fittings 26 bolted, or otherwise secured, to the body of the housing. The housing body 22 is also provided therein with a low pressure passage 28 to which the low pressure system 14 is connected by a fitting 30 bolted, or otherwise secured, to the housing body.

The high pressure and low pressure passages 24 and 28 are interconnected by a main valve means 32 for bypassing fluid from the high pressure passage to the low pressure passage as required to maintain the pressure in the high pressure passage substantially constant relative to that in the low pressure passage. In other words, the main valve means 32, as will be described, maintains a substantially constant differential between the pressures in the high pressure and low pressure passages 24 and 28 so that, if the pressure in the low pressure passage 28 is substantially constant, the pressure in the high pressure passage 24 is also substantially constant.

The main valve means 32, which will be described in detail hereinafter, is actuated by a main actuating means 34 disposed in a chamber 36 between the body 22 of the housing 20 and a cap 38 bolted, or otherwise secured, to the housing body. The main actuating means 34 is operable by a main fluid pressure differential acting between first and second sides 40 and 42 thereof. The first and second sides 40 and 42 of the main actuating means 34 respectively communicate with the high pressure passage 24 through first and second passages 44 and 46. As will be explained, a reduction in fluid pressure on the second side 42 of the main actuating means 34 below the fluid pressure on the first side 40 thereof results in opening movement of the main valve means 32 to bypass fluid from the high pressure passage 24 to the low pressure passage 28. Controlling flow through the second passage 46 from the high pressure passage 24 to the second side 42 of the main actuating means 34 is a metering valve means 48 for decreasing the resistance to flow from the high pressure passage to the second side of the main actuating means as the main valve means is opened. This construction provides a negative feedback means for reducing the main fluid pressure differential as the main valve means is opened, thereby improving the stability of the pressure regulator 10 of the invention.

The aforementioned reduction in the fluid pressure on the second side 42 of the main actuating means 34, which is necessary to produce the main fluid pressure differential for opening the main valve means 32, is produced by a pilot valve means 50 located in a pilot valve housing 52 bolted, or otherwise secured, to the body 22 of the main housing 20. The pilot valve means 50 is operable by a pilot fluid pressure differential equal to a predetermined difference between the fluid pressures in the high pressure and low pressure passages 24 and 28, and controls the main actuating means 34 in a manner to maintain a substantially constant differential between the fluid pressures in the high pressure and low pressure passages. More particularly, the pilot valve means 50 controls the main pressure differential applied to the main actuating means 34 by regulating flow through a control passage 54 connecting the second side 42 of the main actuating means to the low pressure passage 28.

The first passage 44 leading to the first side 40 of the main actuating means 34 communicates with a dashpot means 56 and cooperates therewith to control the rate of response of the main actuating means to an application of the main fluid pressure differential to the main actuating means 34, or to a change in the main fluid pressure differential. The first passage 44 and the dashpot means 56, which will be described in more detail hereinafter, improve the stability of the pressure regulator 10.

*General description of operation of pressure regulator 10*

If the pressure in the high pressure passage 24 exceeds a predetermined value relative to the pressure in the low pressure passage 28, a pilot fluid pressure differential in excess of the predetermined value for which the pilot valve means 50 is set is applied to the pilot valve means to cause it to open the control passage 54. This results in a reduction of the pressure applied to the second side 42 of the main actuating means 34 to a value below the pressure appplied to the first side 40 thereof. Such reduction in the pressure applied to the second side 42 of the main actuating means 34 results from a pressure drop through the metering valve means 48, which pressure drop decreases to provide a negative feedback effect as the main actuating means 34 reacts to the resulting main fluid pressure differential developed thereacross. The main fluid pressure differential applied to the main actuating means 34 causes the main actuating means to open the main valve means 32, at a rate controlled by the effect of the cooperation between the first passage 44 and the dashpot means 56, to open the main valve means 32, thereby bypassing fluid from the high pressure passage 24 to the low pressure passage 28. Consequently, the fluid pressure in the high pressure passage 24 is reduced and, when the pressure in the high pressure passage decreases to a predetermined value relative to the pressure in the low pressure passage, the pilot valve means 50 closes the control passage 54. Thereupon, the main actuating means 34 closes the main valve means 32, at a rate determined by the restriction offered by the metering valve means 48 and by the effect of the cooperation between the first passage 44 and the dashpot means 56. As will be apparent, the main valve means 32 bypasses fluid from the high pressure passage 24 to the low pressure passage 28 only as required to maintain a substantially constant fluid pressure differential between these passages.

*Detailed description of structure of pressure regulator 10*

Considering the main valve means 32 in more detail, it includes a main valve 58 cooperating with a main valve seat 60 to control bypassing of fluid from the high pressure passage 24 to the low pressure passage 28. To obtain maximum stability for the pressure regulator 10, the main valve 58 and its seat 60 are so constructed as to maintain the forces applied to the main valve, as the result of fluid flow between it and its seat, substantially constant irrespective of the position of the main valve relative to its seat. In other words, variations in the fluid-flow forces applied to the main valve 58 with variations in the position of the main valve are minimized, which is an important feature.

Considering how the foregoing is accomplished, the flow of bypassed fluid from the high pressure passage 24 to the low pressure passage 28 is controlled substantially exclusively by a sleeve valve 62 forming part of the main valve 58 and slidable in a cylindrical valve seat 64 forming part of the main valve seat 60. The sleeve valve 62 is provided therein with circumferentially spaced, longitudinally extending, V-shaped ports 66 converging in the direction of opening movement of the main valve 58. With this construction, as the main valve 58 opens, the flow paths through the V-shaped ports 66 are nearly perpendicular to the axis of the main valve. Since jet forces applied to the main valve 58 as the result of the flows through the V-shaped ports 66 are functions of the cosines of the flow-path angle of the axis of the main valve, it will be apparent that such jet forces are substantially zero. Also, they are substantially constant irrespective of the extent of opening of the sleeve valve 62. Thus, this construction virtually eliminates any effect of fluid flow forces on the stability on the pressure regulator 10.

In order to provide a fluid-tight seal when the main valve 58 is closed, it includes a poppet valve 68 engageable with a tapered valve seat 70, the poppet valve being spaced from the smaller ends of the V-shaped ports 66 in the direction of opening movement of the main valve 58. With this construction, upon opening movement of the main valve 58, the poppet valve 68 completely disengages its seat 70 before the smaller ends of the V-shaped ports 66 begin to clear the cylindrical valve seat 64. Consequently, the main valve 58 is not subjected to any significant forces resulting from fluid flow between the poppet valve 68 and its seat 70.

The main valve 58 is carried by a tubular valve stem 72 which is slidable in a bore 74 interconnecting the high pressure passage 24 and the chamber 36 for the main actuating means 34 on the first side 40 of the main actuating means. The main actuating means 34 is shown as comprising a diaphragm 76 the outer periphery of which is clamped between the body 22 of the housing 20 and the cap 38 thereof. The inner periphery of the diaphragm 76 is secured to the valve stem 72 between a dashpot member 78 on the first side 40 of the diaphragm 46 and a spring seat 80 on the second side 42 thereof. The inner peripheries of the dashpot member 78, the diaphragm 76 and the spring seat 80 are seated against progressively smaller external annular shoulders on the valve stem 72, and are held seated thereagainst by a nut 82 threaded on the valve stem.

The dashpot member 78 is preferably a disc slidable in a dashpot chamber 84 which is located on the first side 40 of the diaphragm 76 and which is separated therefrom by the dashpot chamber 84. The first passage 44 connecting the high pressure passage 24 to the first side 40 of the diaphragm 76 has the form of a restricted external helical groove 86 in the valve stem 72, such helical groove communicating at one end with the high pressure passage 24 and at its other end with the dashpot chamber 84. There is a slight clearance, not shown, between the dashpot member 78 and the peripheral wall of its chamber 84 which gives the dashpot means 56 its characteristic damping action. This clearance permits the fluid entering the dashpot chamber 84 through the restricted helical groove 86 to act on the first side 40 of the diaphragm 76. The restricted helical groove 86 and the dashpot means 56, the latter comprising the dashpot member 78 slidable in the dashpot chamber 84, cooperate to restrict the response of the main valve 58 to a main fluid pressure differential across the diaphragm 76. Such restriction of the response of the main valve 58 enhances the over-all stability of the pressure regulator 10.

The second passage 46 for connecting the high pressure passage 24 to the second side 42 of the diaphragm 76 includes radial ports 88 in the valve stem 72 which communicate at their outer ends with the high pressure passage 24 and at their inner ends with an axial passage 90 in the valve stem. The axial passage 90 communicates, on the second side 42 of the diaphragm 76, with the inner ends of raidal ports 92 communicating at their outer ends with an annular clearance 94 around the valve stem in the vicinity of the ports 92. The outer periphery of the annular clearance 94 is formed by a member 96 having a cylindrical bore 98 in which the adjacent end portion of the valve stem 72 is slidable, the member 96 being seated against the cap 38 of the housing 20 by a compression coil spring 100 engaging the member 96 at one end and the nut 82 on the valve stem at its other end. The member 96 is provided with an internal annular groove 102 at a point which is spaced axially from the ports 92 in the valve stem 72 when the main valve 58 is closed, the member 96 also being provided therein with radial ports 104 which communicate with the groove 102 at their inner ends and which communicate at their outer ends with the chamber 36 on the second side 42 of the diaphragm 76.

Encircling the member 96, and the spring 100 for maintaining it seated against the cap 38, is a compression coil spring 106 seated at one end against the cap 38 and at its other end against the spring seat 80 attached to the valve stem 72. The spring 106 holds the main valve 58 closed as long as the fluid pressures on the first and second sides 40 and 42 of the diaphragm 76 are equal, and until such time as the fluid pressure on the second side 42 thereof is reduced below the fluid pressure on the first side thereof sufficiently to overcome this spring. Such reduction in pressure on the second side 42 of the diaphragm 76 is produced by the pilot valve means 50 in a manner to be described.

It will be noted that the valve stem 72 is externally divergent in the axial direction from the radial ports 92 therein toward the internal annular groove 102 in the member 96. In other words, the annular clearance 94 between the valve stem 72 and the member 96 converges axially from the radial ports 92 in the valve stem toward the internal annular groove 102 in the member 96. This structure constitutes the metering valve means 48, the axially tapered portion of the valve stem 72 forming a metering valve element 108 and the cylindrical bore 98 in the member 96 forming, adjacent the internal annular groove 102, a cylindrical metering valve seat for such metering valve element. As will be apparent, when the main valve 58 is closed, or only slightly open, the metering valve element 108 cooperates with its seat 98 to provide a high restriction to flow through the second passage 46 into the chamber 36 on the second side 42 of the diaphragm 76. This has the effect of producing a high initial pressure drop to produce a high initial main fluid pressure differential across the diaphragm 76 when the pilot valve means 50 opens the control passage 54. However, as the main valve 58 moves from its closed position through progressively more open positions, the tapered metering valve element 108 progressively decreases the restriction to flow through the second passage 46, and thus progressively reduces the pressure drop provided by the metering valve means. In other words, the main fluid pressure differential acting to produce continued opening movement of the main valve 58 progressively decreases. Thus, the metering valve means 48 acts as a negative feedback means for reducing the main fluid pressure differential acting on the diaphragm 76 as the main valve 58 is moved from its closed position toward its fully open position. This action has a highly significant effect in improving the over-all stability of the pressure regulator 10, which is an important feature of the invention.

Turning now to a consideration of the pilot valve means 50, it includes a pilot valve 110 having the form of a needle value engageable with a pilot valve seat 112 in the control passage 54. The latter includes passages 114 and 116 respectively formed in the cap 38 and housing body 22 and connecting the second side 42 of the diaphragm 76 to the upstream side of the pilot valve seat 112. The downstream side of the pilot valve seat 112 is connected to the low pressure passage 28 by a passage 118 formed in the housing body 22 and forming part of the over-all control passage 54.

The pilot valve means 50 also includes a differential-area pilot valve piston 120 connected to the pilot valve 110 and having major and minor portions 122 and 124 respectively disposed in major and minor bores 126 and 128 in a sleeve 130 within the pilot valve housing 52. The differential area 132 between the cross-sectional areas of the major and minor portions 122 and 124 of the pilot valve piston 120 is exposed to the fluid pressure in the high pressure passage 24 through passages 134 and 136 respectively formed in the housing body 22 and the pilot valve housing 52. The ends of the pilot valve piston 120 are exposed to the fluid pressure in the low pressure passage 28, the smaller end by way of the passage 118 and the larger end by way of a passage 138 connecting the passage 118 to a spring chamber 140 within the pilot valve housing 52. Thus, the pilot valve piston 120 is responsive substantially only to the fluid pressures in the high pressure and low pressure passages 24 and 28, being substantially independent of any other fluid pressures in the pressure regulator 10.

Telescoped over the larger end of the pilot valve piston 120 within the spring chamber 140 is a seat 142 for one end of a compression coil spring 144 in the spring chamber. The other end of the spring 144 is connected to a seat 146 telescoped over one end of an axially slidable pin 148. The other end of the pin 148 is engaged by an axial adjusting screw 150 threaded into an adjusting thimble 152 which is threaded onto the pilot valve housing 52.

As will be apparent, by rotating the thimble 152, the extent to which the spring 144 is compressed may be varied to vary the difference between the fluid pressures in the high pressure and low pressure passages 24 and 28 which is required to disengage the pilot valve 110 from its seat 112. Preferably, the skirt of the thimble 152 and the adjacent portion of the pilot valve housing 52 are provided thereon with suitable indicia, not shown, indicating the range of differences between the fluid pressures in the high pressure and low pressure passages 24 and 28 through which the response of the pilot valve piston 120 can be adjusted to cause the pressure regulator 10 to maintain corresponding differences in pressure between the high pressure and low pressure passages 24 and 28.

The adjusting screw 150 may be utilized during calibration to so adjust the position of the thimble 152 relative to the pilot valve housing 52 as to cause the indicia thereon to indicate correctly the differentials between the fluid pressures in the high pressure and low pressure passages 24 and 28 to which the pilot valve means 50 responds.

*Detailed description of operation of pressure regulator 10*

As long as the difference between the fluid pressures in the high pressure and low pressure passages 24 and 28 does not exceed the value for which the adjusting thimble 152 is set, the pilot valve 110 remains seated on its seat 112 to close the control passage 54. Under these conditions, both sides 40 and 42 of the diaphragm 76 are subjected to the fluid pressure in the high pressure passage 24, with the result that the main valve 58 is held closed by the spring 106 (and to a slight degree by the light spring 100). Also, the main valve 58 is biased toward its closed position by a fluid pressure differential which exists because of the fact that a part of the cross-sectional area of the main valve is always exposed to the fluid pressure in the low pressure passage 28.

If the pressure in the high pressure passage 24 increases, or the pressure in the low pressure passage 28 decreases, sufficiently to increase the difference between these pressures to a value above that for which the thimble 152 is set, the fluid pressure in the high pressure passage acting on the differential area 132 of the pilot valve piston 120 unseats the pilot valve 110 to open the control passage 54, the extent of opening of the control passage depending upon the extent to which the pressure difference between the high pressure and low pressure passages exceeds the preset pressure difference.

As soon as the pilot valve 110 unseats, the pressure in the chamber 36 on the second side 42 of the diaphragm 76 is reduced, this being the result of the pressure drop produced by the metering valve means 48. Ultimately, the spring and pressure differential forces tending to hold the main valve 58 closed are overcome, and opening movement of the main valve 58 is initiated, such opening movement first resulting in unseating of the poppet valve 68 and thereafter in uncovering of the smaller ends of the V-shaped ports 66 in the sleeve valve 62. The rate of response of the main valve 58 is controlled not only by the metering valve means 48, but also by the dashpot means 56 and the action of the restricted helical groove 86 in supplying fluid from the high pressure passage 24 to the dashpot chamber 84.

As the sleeve valve 62 opens, fluid is bypassed from the high pressure passage 24 to the low pressure passage 28 to tend to restore the pressure difference between these passages to the preset value determined by the position of the adjusting thimble 152. As the main valve 58 opens to accomplish this, the smaller end of the tapered metering valve element 108 moves closer to the internal annular groove 102 in the member 96 to reduce the pressure drop through the metering valve means 48, and thus reduce the main fluid pressure differential across the diaphragm 76 which produces the opening movement of the main valve. As previously explained, this provides a negative feedback effect which greatly enhances the stability of the pressure regulator 10.

Ultimately, as the pressure in the high pressure passage 24 is reduced relative to the pressure in the low pressure passage 28 to a value approaching the preset value, the pilot valve 110 moves toward its seat 112 until it eventually closes the control passage 54. This causes the pressure in the chamber 36 on the second side 42 of the diaphragm 76 to increase until it eventually reaches a value sufficiently high to initate closing movement of, and ultimately to close, the main valve 58. It will be noted that the pressure buildup on the second side 42 of the diaphragm 76 progresses at a decreasing rate due to the increasing rate of restriction offered by the metering valve means 48 as the main valve 58 moves toward its closed position. Also, the dashpot means 56 and the restricted helical groove 86 control the rate of closing movement of the main valve 58.

Once the main valves 58 closes, it remains closed as long as the difference between the fluid pressures in the high pressure and low pressure passages 24 and 28 does not exceed the value for which the pilot valve means 50 is set. Thus, the pressure regulator 10 bypasses fluid only when necessary to maintain the predetermined pressure difference, there being no necessity for a continuous bleed of fluid from the high pressure passage to the low pressure passage.

Although an exemplary embodiment of the invention has been disclosed herein for purposes of illustration, it will be understood that various changes, modifications and substitutions may be incorporated in such embodiment without departing from the spirit of the invention as defined by the claims which follow.

I claim:
1. In a pressure regulator for maintaining a substantially constant fluid pressure in a high pressure system relative to the fluid pressure in a low pressure system, the combination of:
  (a) a housing having high pressure and low pressure passages respectively connectible to the high pressure and low pressure systems;
  (b) main valve means in said housing and interconnecting said high pressure and low pressure passages and including a main valve movable from a closed position to an open position to bypass fluid from said high pressure passage to said low pressure passage;
  (c) main actuating means located in said housing, and connected to said main valve, and operable by a main fluid pressure differential acting between opposite sides thereof, for moving said main valve from its closed position toward its open position;
  (d) said main fluid pressure differential being equal to a difference between a fluid pressure acting on one of said sides of said main actuating means and biasing said main valve toward its open position and a fluid pressure acting on the other of said sides of said main actuating means and biasing said main valve toward its closed position;
  sure passage to said one side of said main actuating means and the other connecting said high pressure passage to said other side of said main actuating means;
  (f) differential-area pilot valve means including metering means in said housing, and connecting said other side of said main actuating means to said low pressure passage, and openable by a pilot fluid pressure differential equal to a predetermined difference between the fluid pressures in said high pressure and low pressure passages, and exposed solely to the fluid pressures in said high pressure and low pressure passages, for reducing the fluid pressure on said other side of said main actuating means to a value below that on said one side thereof so as to produce said main fluid pressure differential, and thus cause said main actuating means to move said main valve from its closed position toward its open position; and
  (g) metering valve means in and controlling flow through said other passage means, and including a metering valve connected to said main actuating means, for decreasing the resistance to flow from said high pressure passage through said other passage means to said other side of said main actuating means as said main valve is moved from its closed position toward its open position.

2. In a pressure regulator for maintaining a substantially constant fluid pressure in a high pressure system relative to the fluid pressure in a low pressure system, the combination of:
  (a) a housing having high pressure and low pressure passages respectivley connectible to the high pressure and low pressure systems;
  (b) main valve means in said housing and interconnecting said high pressure and low pressure passages and including a main valve movable from a closed position to an open position to bypass fluid from said high pressure passage to said low pressure passage;
  (c) main actuating means located in said housing, and connected to said main valve, and operable by a main fluid pressure differential acting between opposite sides thereof, for moving said main valve from its closed position toward its open position;
  (d) said main fluid pressure differential being equal to a difference between a fluid pressure acting on one of said sides of said main actuating means and biasing said main valve toward its open position and a fluid pressure acting on the other of said sides of said main actuating means and biasing said main valve toward its closed position;
  (e) two passage means one connecting said high pressure passage to said one side of said main actuating means and the other connecting said high pressure passage to said other side of said main actuating means;
  (f) differential-area pilot valve means including metering means in said housing, and connecting said other side of said main actuating means to said low pressure passage, and openable by a pilot fluid pressure differential equal to a predetermined difference between the fluid pressures in said high pressure and low pressure passages, and exposed solely to the fluid pressures in said high pressure and low pressure passages, for reducing the fluid pressure on said other side of said main actuating means to a value below that on said one side thereof so as to produce said main fluid pressure differential, and thus cause said main actuating means to move said main valve from its closed position toward its open position;
  (g) metering valve means in and controlling flow through said other passage means, and including a metering valve connected to said main actuating means, for decreasing the resistance to flow from said high pressure passage through said other passage means to said other side of said main actuating means as said main valve is moved from its closed position toward its open position; and (h) said one passage means including means for restricting flow between said high pressure passage and said one side of said main actuating means.

3. In a pressure regulator for maintaining a substantially constant fluid pressure in a high pressure system relative to the fluid pressure in a low pressure system, the combination of:

(a) a housing having high pressure and low pressure passages respectively connectible to the high pressure and low pressure systems;

(b) main valve means in said housing and interconnecting said high pressure and low pressure passages and including a main valve movable from a closed position to an open position to bypass fluid from said high pressure passage to said low pressure passage;

(c) main actuating means located in said housing, and connected to said main valve, and operable by a main fluid pressure differential acting between opposite sides thereof, for moving said main valve from its closed position toward its open position;

(d) said main fluid pressure differential being equal to a difference between a fluid pressure acting on one of said sides of said main actuating means and biasing said main valve toward its open position and a fluid pressure acting on the other of said sides of said main actuating means and biasing said main valve toward its closed position;

(e) two passage means one connecting said high pressure passage to said one side of said main actuating means and the other connecting said high pressure passage to said other side of said main actuating means;

(f) differential-area pilot valve means including metering means in said housing, and connecting said other side of said main actuating means to said low pressure passage, and openable by a pilot fluid pressure differential equal to a predetermined difference between the fluid pressures in said high pressure and low pressure passages, and exposed solely to the fluid pressures in said high pressure and low pressure passages, for reducing the fluid pressure on said other side of said main actuating means to a value below that on said one side thereof so as to produce said main fluid pressure differential, and thus cause said main actuating means to move said main valve from its closed position toward its open position;

(g) metering valve means in and controlling flow through said other passage means, and including a metering valve connected to said main actuating means, for decreasing the resistance to flow from said high pressure passage through said other passage means to said other side of said main actuating means as said main valve is moved from its closed position toward its open position;

(h) said one passage means including means for restricting flow between said high pressure passage and said one side of said main actuating means; and (i) dashpot means connected to said main actuating means and communicating with said one passage means for controlling the rate of response of said main actuating means to a change in the fluid pressure on said other side of said main actuating means.

4. In a pressure regulator for maintaining a substantially constant fluid pressure in a high pressure system relative to the fluid pressure in a low pressure system, the combination of:

(a) a housing having high pressure and low pressure passages respectively connectible to the high pressure and low pressure systems;

(b) main valve means in said housing and interconnecting said high pressure and low pressure passages and incluidng a main valve movable from a closed position to an open position to bypass fluid from said high pressure passage to said low pressure passage;

(c) main actuating means located in said housing, and connected to said main valve, and operable by a main fluid pressure differential acting between opposite sides thereof, for moving said main valve from its closed position toward its open position;

(d) said main fluid pressure differential being equal to a difference between a fluid pressure acting on one of said sides of said main actuating means and biasing said main valve toward its open position and a fluid pressure acting on the other of said sides of said main actuating means and biasing said main valve toward its closed position;

(e) two passage means one connecting said high pressure passage to said one side of said main actuating means and the other connecting said high pressure passage to said other side of said main actuating means;

(f) differential-area pilot valve means including metering means in said housing, and connecting said other side of said main actuating means to said low pressure passage, and openable by a pilot fluid pressure differential equal to a predetermined difference between the fluid pressures in said high pressure and low pressure passages, and exposed solely to the fluid pressures in said high pressure and low pressure passages, for reducing the fluid pressure on said other side of said main actuating means to a value below that on said one side thereof so as to produce said main fluid pressure differential, and thus cause said main actuating means to move said main valve from its closed position toward its open position;

(g) metering valve means in and controlling flow through said other passage means, and including a metering valve connected to said main actuating means, for decreasing the resistance to flow from said high pressure passage through said other passage means to said other side of said main actuating means as said main valve is moved from its closed position toward its open position;

(h) said one passage means including means for restricting flow between said high pressure passage and said one side of said main actuating means;

(i) said main valve means including a cylindrical valve seat; and (j) said main valve including a sleeve valve slidable in said cylindrical valve seat and having longitudinally extending ports therein.

5. In a pressure regulator for maintaining a substantially constant fluid pressure in a high pressure system relative to the fluid pressure in a low pressure system, the combination of:

(a) a housing having high pressure and low pressure passages respectively connectible to the high pressure and low pressure systems;

(b) main valve means in said housing and interconnecting said high pressure and low pressure passages and including a main valve movable from a closed position to an open position to bypass fluid from said high pressure passage to said low pressure passage;

(c) main actuating means located in said housing, and connected to said main valve, and operable by a main fluid pressure differential acting between opposite sides thereof, for moving said main valve from its closed position toward its open position;

(d) said main fluid pressure differential being equal to a difference between a fluid pressure acting on one of said sides of said main actuating means and biasing said main valve toward its open position and a fluid pressure acting on the other of said sides of said main actuating means and biasing said main valve toward its closed position;

(e) two passage means one connecting said high pressure passage to said one side of said main actuating means and the other connecting said high pressure passage to said other side of said main actuating means;

(f) differential-area pilot valve means including metering means in said housing, and connecting said other side of said main actuating means to said low pressure passage, and openable by a pilot fluid pressure differential equal to a predetermined difference between the fluid pressures in said high pressure and low pressure passages, and exposed solely to the fluid pressures in said high pressure and low pressure passages, for reducing the fluid pressure on said other side of said main actuating means to a value below that on said one side thereof so as to produce said main fluid pressure differential, and thus cause said main actuating means to move said main valve from its closed position toward its open position;

(g) metering valve means in and controlling flow through said other passage means, and including a metering valve connected to said main actuating means, for decreasing the resistance to flow from said high pressure passage through said other passage means to said other side of said main actuating means as said main valve is moved from its closed position toward its open position;

(h) said one passage means including means for restricting flow between said high pressure passage and said one side of said main actuating means;

(i) said main valve means including a cylindrical valve seat and a tapered valve seat; and (j) said main valve including a sleeve valve slidable in said cylindrical valve seat and having longitudinally extending, V-shaped ports therein, and including a poppet valve engageable with said tapered valve seat.

6. In a pressure regulator for maintaining a substantially constant fluid pressure in a high pressure system relative to the fluid pressure in a low pressure system, the combination of:

(a) a housing having high pressure and low pressure passages respectively connectible to the high pressure and low pressure systems;

(b) main valve means in said housing and interconnecting said high pressure and low pressure passages and including a main valve movable from a closed position to an open position to bypass fluid from said high pressure passage to said low pressure passage;

(c) main actuating means located in said housing, and connected to said main valve, and operable by a main fluid pressure differential acting between opposite sides thereof, for moving said main valve from its closed position toward its open position;

(d) said main fluid pressure differential being equal to a difference between a fluid pressure acting on one of said sides of said main actuating means and biasing said main valve toward its open position and a fluid pressure acting on the other of said sides of said main actuating means and biasing said main valve toward its closed position;

(e) two passage means one connecting said high pressure passage to said one side of said main actuating means and the other connecting said high pressure passage to said other side of said main actuating means;

(f) differential-area pilot valve means including metering means in said housing, and connecting said other side of said main actuating means to said low pressure passage, and openable by a pilot fluid pressure differential equal to a predetermined difference between the fluid pressures in said high pressure and low pressure passages, and exposed solely to the fluid pressures in said high pressure and low pressure passages, for reducing the fluid pressure on said other side of said main actuating means to a value below that on said one side thereof so as to produce said main fluid pressure differential, and thus cause said main actuating means to move said main valve from its closed position toward its open position;

(g) metering valve means in and controlling flow through said other passage means, and including a metering valve connected to said main actuating means, for decreasing the resistance to flow from said high pressure passage through said other passage means to said other side of said main actuating means as said main valve is moved from its closed position toward its open position;

(h) said one passage means including means for restricting flow between said high pressure passage and said one side of said main actuating means; and (i) adjustment means connected to said pilot valve means for varying said predetermined difference between the fluid pressures in said high pressure and low pressure passages.

References Cited by the Examiner

UNITED STATES PATENTS

| 143,920 | 10/1873 | Mayer | 137—489 |
|---|---|---|---|
| 703,687 | 7/1902 | Warren | 137—489 |
| 859,920 | 7/1907 | Cunning | 137—489 |
| 1,046,236 | 12/1912 | Wagner | 251—35 |
| 1,357,837 | 11/1920 | Bouvier | 137—489 |
| 1,719,686 | 7/1929 | Browne | 137—489 |
| 2,245,210 | 6/1941 | McElwaine | 137—505.12 |

MARTIN P. SCHWADRON, *Primary Examiner.*

UNITED STATES PATENT OFFICE
CERTIFICATE OF CORRECTION

Patent No. 3,272,227  September 13, 1966

Carter P. Williams

It is hereby certified that error appears in the above numbered patent requiring correction and that the said Letters Patent should read as corrected below.

Column 2, line 54, for "acting" read -- actuating --; column 3, line 14, for "include" read -- includes --; line 65, for "an" read -- any --; column 5, line 11, for "of" read -- in --; column 7, line 51, for "value" read -- valve --; column 9, after line 73, insert -- (e) two passage means one connecting said high pres- --; column 11, line 32, for "high" read -- main --.

Signed and sealed this 1st day of August 1967.

(SEAL)
Attest:

Edward M. Fletcher, Jr.  
Attesting Officer

EDWARD J. BRENNER  
Commissioner of Patents